UNITED STATES PATENT OFFICE.

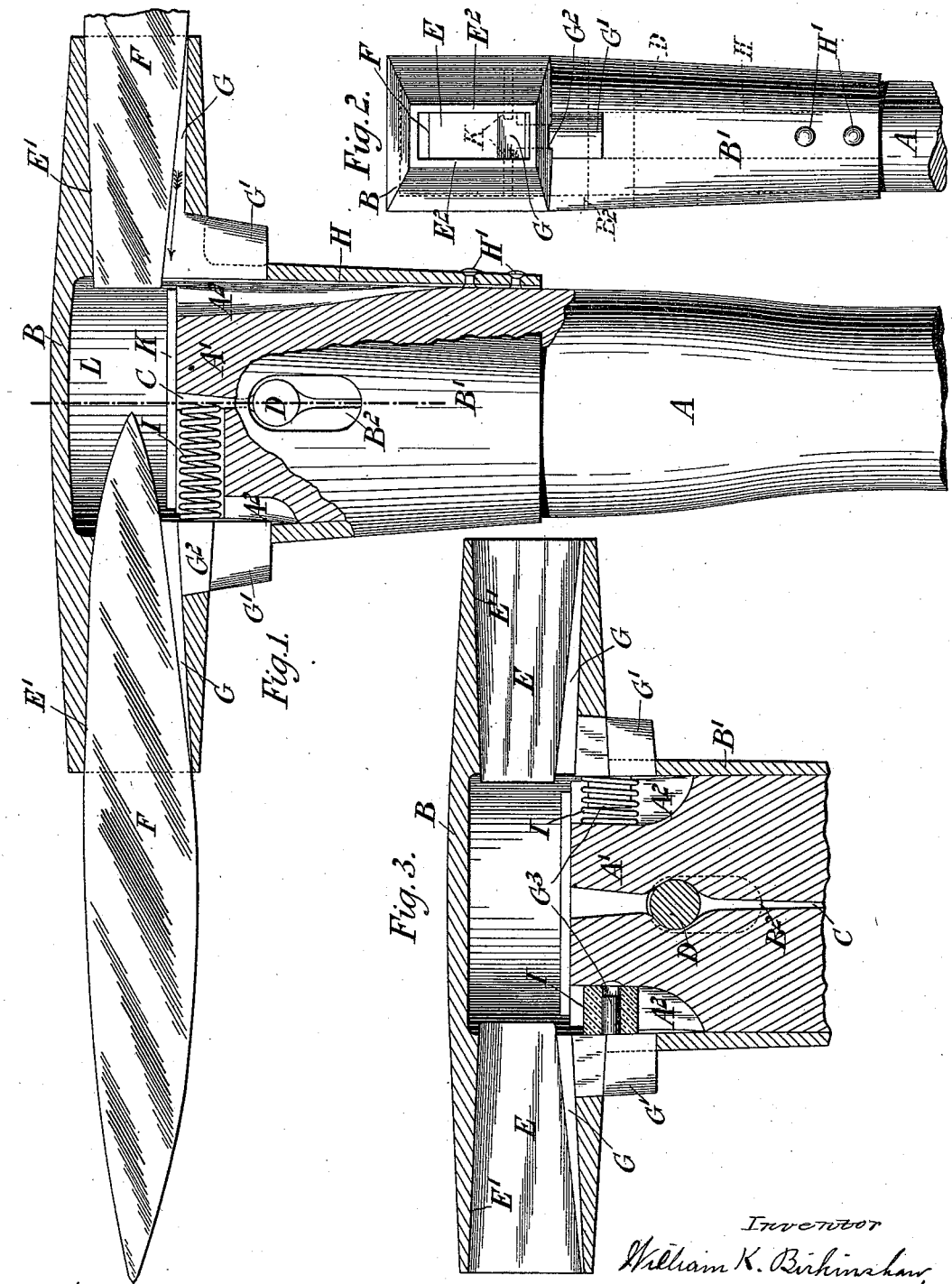

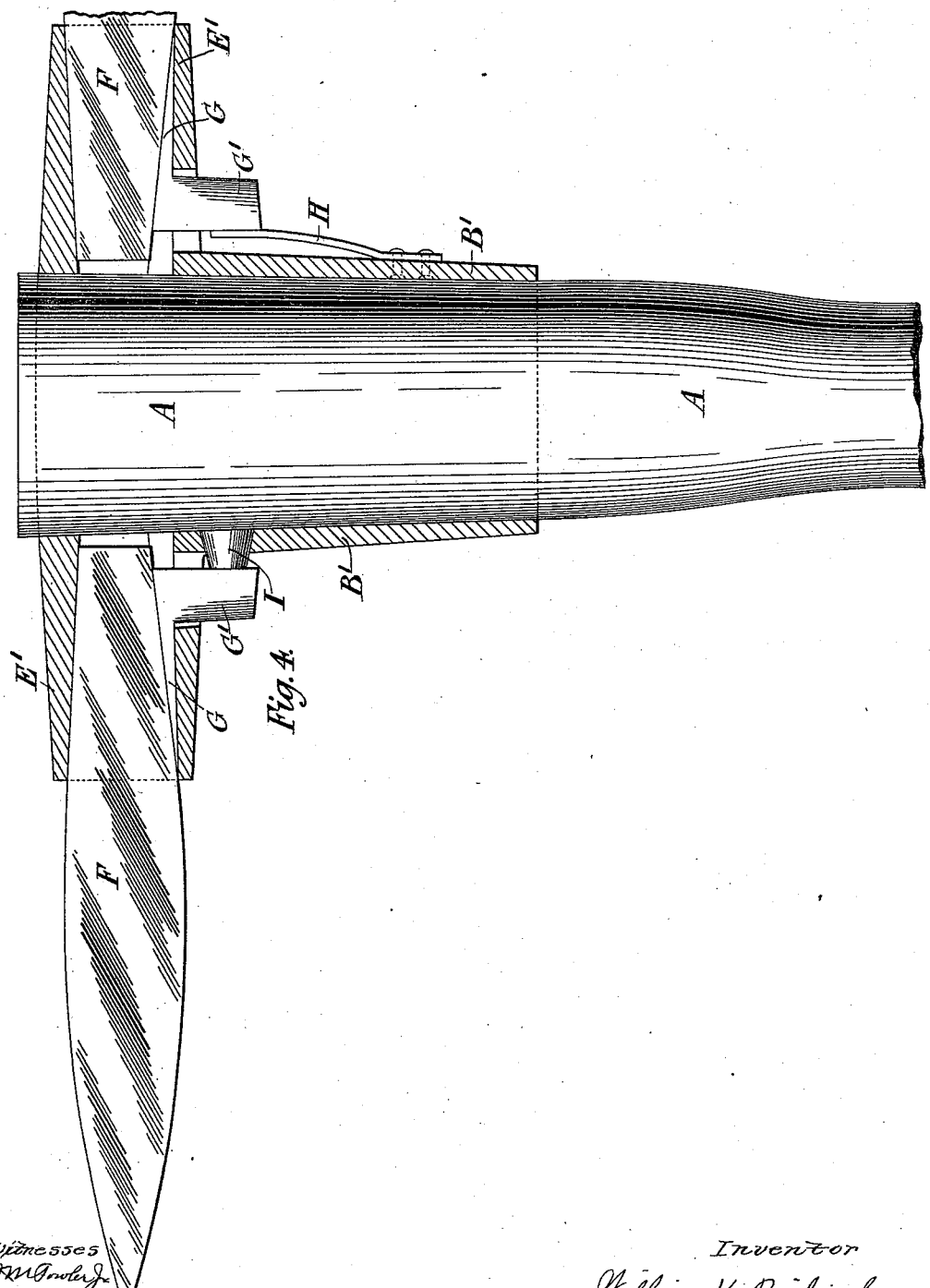

WILLIAM KIRKLEY BIRKINSHAW, OF QUARNDON, ENGLAND.

PICK OR SIMILAR TOOL.

SPECIFICATION forming part of Letters Patent No. 527,829, dated October 23, 1894.

Application filed March 29, 1893. Serial No. 468,093. (No model.)

*To all whom it may concern:*

Be it known that I, WILLIAM KIRKLEY BIRKINSHAW, a subject of the Queen of England, residing at Quarndon, Derby, England, have invented certain new and useful Improvements in Picks or Similar Tools, of which the following is a specification.

This invention relates to heads for picks and other tools either blunt or cutting, where the operative part or tool is intended to be removed from the head.

In carrying out the invention I employ a head adapted to fit on to the shaft, which may be protected by a steel or other shoe if desired, the head being held upon the shaft by the taper, both the socket of the head and the end of the shaft being tapered as is now commonly done. The points or operative parts or faces enter sockets provided for them in the head, and are tapered so that they can only enter their sockets to the required distance which will keep their inner ends clear of the shaft. In each of these sockets is placed a wedge having a projecting head or end so arranged that the wedge may be placed in position in the tool socket from the open end or from the shaft socket when the shaft is not in, the shaft when inserted keeping the wedges from falling out. The tools or points may now be inserted into the space left for them and will by the blows given to them in using the tool, be securely fixed in the head. To remove the tools or points the shaft may be withdrawn from the head and wedges driven inwardly toward the center of the head, thus releasing the points or blades which will then drop out or can be removed.

In the accompanying drawings, Figure 1 is a side view partly in section and partly in elevation of the pick-head and the end of the shaft; Fig. 2, an edge view of Fig. 1, and Fig. 3, a sectional side view of the head showing modified arrangements of the wedge springs. Fig. 4 is a sectional side view in which the shaft is carried through the head, showing also a further modified arrangement of the wedge springs.

Like letters represent like parts throughout the drawings.

A is the shaft or handle and B the head having a handle socket or eye B' of suitable length and shape. This socket is tapered as shown in Fig. 1 so that its open end through which the handle projects is smaller than its inner or closed end, the handle or shaft being split and its divided ends forced apart inside the eye so as to prevent it from coming out. I prefer to run a saw-cut C up the end of the shaft which is made of a suitable size to enter the open end of the eye B' and I force apart the divided ends A' of the shaft by any suitable form of wedge or equivalent, preferably a tapered or other pin D for the reception of which a portion of the saw-cut C is enlarged as indicated in the drawings. This pin or wedge may be driven tight in and usually is held so firmly by the spring and compression of the ends of the shaft that there is no danger of its coming out; nevertheless it may be glued or otherwise secured in if desired. The head socket B' is preferably provided with an opening $B^2$ on each side to allow of the insertion of the pin or wedge.

The head B is provided with tool or point sockets E tapered on one or both edges E' and parallel upon their sides or larger faces $E^2$ the larger ends of the tapers being at the open or outer ends of the sockets. Internally these tool sockets open into the eye or shaft socket inside the head and the tools or points F are tapered on their edges to suit the sockets as clearly shown in Fig. 1 of the drawings, so that they can only enter the sockets to a certain distance, the use of the pick or tool serving to force them more firmly into their sockets.

At one of the narrower faces E' of each socket E I place a wedge or equivalent G having a head G' arranged to project through the head B as shown in the drawings, the dotted lines in Fig. 1 indicating the outer walls of the head. The object of this projection is to enable the wedge to be knocked out in the direction of the arrow in Fig. 1 by the blow of a hammer or equivalent from the outside upon the head G'. The withdrawal of the wedge releases the tool or point F. The shaft if, as in Fig. 1, it extends up so high as to interfere with the inward movement of the wedges, may be recessed as at $A^2$ to allow of their free movement. It is not absolutely necessary that any means should be provided for holding or securing the wedges G as they cannot fall entirely out even if the points F are withdrawn if the heads G' are made sufficiently large to prevent this. It is however convenient that they should always retain as nearly as possible their proper positions and I therefore prefer to adopt some arrangement of springs or equivalent to secure this. Upon the right-hand side of Fig. 1 a plate spring H is shown riveted at H' to the inside of the socket B' and also rivetted or otherwise secured to the inner end of the head G'. When the wedge is driven in toward the shaft to release the tool the spring H gives way but returns the wedge to its normal position as soon as it is allowed to do so. With this spring no guides are required for the wedges. This spring H may be sunk in a recess or opening in the socket or head to avoid cutting the shaft; or it may be placed outside the socket, as shown in Fig. 4.

Upon the left-hand side of Fig. 1 a helical spring I is shown bearing upon the back of the head G' which latter is slightly recessed at $G^2$ to engage with the walls of the tool socket as shown in Fig. 2 so as to guide the wedge. The spring I may be held in a suitable recess in the end of the tool shaft A' the plate K serving as a cover and holding it in place. This plate K may be screwed or otherwise secured in position upon the shaft or it may be merely a diaphragm or projection cast in the head. In Fig. 2 it is shown in the form of two plates or stops projecting from the inner walls of the head into the cavity or inner end L of the eye. In Fig. 3 the same idea is carried out but the wedge head G' upon the right-hand side of the figure carries an extension $G^3$ upon which is placed the helical spring I which may be accommodated with a special circular or other recess in the end of the shaft A' if desired. On the left-hand side of Fig. 3 a similar arrangement is shown but the helical spring is replaced by a block of rubber I for the same purpose and intended to act in the same manner; or this block may be simply inserted in a recess in the shaft the wedge bearing against it. The tool is thus secured by jamming or gripping it between two surfaces one or both of which can be withdrawn or so far relaxed that the pressure between it and the tool is reduced or entirely removed so as to permit of the removal of the tool from its socket, and I have described a wedge as the best means known to me for accomplishing this. The same result however may be attained by other means without using a wedge. For example one or more screws might provide the necessary hold for the tool and these could be slackened or withdrawn to release it.

With an arrangement such as shown in Figs. 1 and 3 where room is left inside the head the tool or point may be made double-ended as shown upon the left side of Fig. 1, so long as the two tools do not meet. With this arrangement the miner has at his disposal four working points or faces. This plan could not be adopted when the tool had only a shank to fit into the socket and the working face—as for instance an ax, adze or hammer—was not suitable to enter the head.

I have already explained at the commencement of my specification that the shaft or handle may be made removable and inserted through the larger end of the taper in the head which would be left open for this purpose if desired, but I think on the whole the form I have illustrated is the most perfect one although the other would make a good workable tool.

I have described the tool socket as being tapered on both its narrower edges or faces and I prefer that it should be so tapered, but the face upon which the wedge bears need not necessarily be tapered although I prefer to have it so.

While I have shown and described but one means of guiding and positioning the wedges in the sockets other means will readily occur to those skilled in the art. Thus for example I might undercut or dovetail the socket so that the wedges would work in channels or their equivalent, and thus be prevented from escaping from their proper places.

Having now particularly described and ascertained the nature of the said invention, and in what manner the same is to be performed, I wish it to be understood that I am aware that tapered tool sockets with their larger ends outward, have before now been used, the tools or points being fixed by blows from the outside, and driven out by wedge action from the inside. I am also aware that various devices have been employed for fixing the blades or tools in the sockets when inserted from the inside, and I make no general claim to these features.

What I claim is—

1. In a pick or similar tool, the combination with the head having the tapered tool sockets the shaft within said head, the tapered points or tools adapted to fit within said sockets, of the wedges located within the sockets with the thicker part inward, and capable of being moved inward to release the point while the shaft is in place; substantially as described.

2. In a pick or similar tool, the combination with the head having the tapered sockets, the shaft within said head, the tapered tool points adapted to fit within the tool sockets, the wedges within the sockets, having the heads, of the springs or their equivalent bearing against the wedge head, whereby the wedge will be held in proper position, but will be permitted an inward movement against the pressure of the spring; substantially as described.

3. In a pick or similar tool, the combination with the head having the tapered tool sockets, the tapered tool points fitting in said sockets, the wedges within the sockets having the heads projecting through openings in the tool head, and the shaft, having the recesses, within which the head of the wedge moves when forced inward; substantially as described.

4. In a pick or similar tool, the combination with the head having the tapered tool sockets, the tapered points fitting in said sockets, and the wedges within the sockets, having the heads projecting through openings in the tool head, said wedge heads provided with recesses on the sides engaging the walls of the sockets, whereby the wedges will be properly guided and positioned; substantially as described.

5. In a pick or similar tool, the combination with the head having the tapered sockets, the tapered points fitting in said sockets, the wedges within the sockets, having the heads, the shaft, recesses as shown, and the springs or their equivalent located in said recesses and bearing against the head of the wedge to keep it normally pressed outward; substantially as described.

6. In a pick or similar tool, the combination with the head having the tapered sockets, the tapered points fitting in said sockets, of the wedges within the sockets, having the heads, provided with a stud or projection the shaft having the recesses into which said stud or projection extends, and the coil spring or its equivalent encircling said stud or projection; as and for the purpose set forth.

7. In a pick or similar tool, the combination with the head having the tapered sockets, the tapered tool points fitting within said sockets, the wedges having the heads within said sockets, the shaft extending into the head, and having the recesses at the upper end, the spring or its equivalent within said recesses, bearing against the wedge head, and the plate secured to the top of the shaft, for holding the spring in place; substantially as described.

8. In a pick or similar tool, the combination with the handle socket tapered as shown, provided with openings at each side, of the shaft adapted to fit within said socket, having the wedge shaped slit or cut in its upper end, formed with an enlargement, and the pin adapted to enter said enlarged portion of the cut, through the openings in the side of the sockets and thus spread apart the upper ends of the shaft; substantially as and for the purpose set forth.

In testimony whereof I have hereto set my hand in the presence of two subscribing witnesses.

WILLIAM KIRKLEY BIRKINSHAW.

Witnesses:
ALFRED J. BOULT,
HARRY B. BRIDGE.